United States Patent [19]

Yasuda

[11] Patent Number: 5,532,562
[45] Date of Patent: Jul. 2, 1996

[54] APPARATUS FOR CONTROLLING DC MOTOR WITH H-BRIDGE SWITCHING CIRCUIT

[75] Inventor: Yukio Yasuda, Itami, Japan

[73] Assignee: Mitsubishi Denki Kabushiki Kaisha, Tokyo, Japan

[21] Appl. No.: 267,378

[22] Filed: Jun. 29, 1994

[30] Foreign Application Priority Data

Jun. 30, 1993 [JP] Japan .................................. 5-162834

[51] Int. Cl.$^6$ ................................................. H01R 39/46
[52] U.S. Cl. ........................ 318/439; 318/254; 318/138; 318/484; 388/907.2; 363/128; 363/54; 363/58
[58] Field of Search ..................................... 318/254, 439, 318/138, 445, 484; 363/132, 136, 127–128, 54, 58; 388/819, 804, 829, 907.2, 831, 811

[56] References Cited

U.S. PATENT DOCUMENTS

| 3,701,934 | 10/1972 | Guidicelli | 318/445 |
| 4,051,418 | 9/1977 | O'Berto et al. | 318/138 |
| 4,240,014 | 12/1980 | Muller | 318/254 |
| 4,325,011 | 4/1982 | Peterson | 318/138 |
| 4,443,744 | 4/1984 | Konrad | 318/254 |
| 5,068,582 | 11/1991 | Scott | 318/254 |

*Primary Examiner*—William M. Shoop, Jr.
*Assistant Examiner*—Karen Masth
*Attorney, Agent, or Firm*—Leydig, Voit & Mayer

[57] ABSTRACT

A control circuit for an H-bridge circuit comprises a single capacitor, a charge/discharge circuit for charging/discharging the capacitor in response to a control command signal, a voltage detector circuit for detecting a voltage appearing across the capacitor and a hold circuit for holding the control command signal in response to of a predetermined voltage detected by the voltage detection circuit. Charge and discharge of the capacitor is controlled in dependence on changes in the control command signal to thereby prevent occurrence of a through-current flow in the H-bridge circuit while allowing the bridge circuit to be changed over to the operation state indicated by the control command signal after lapse of charge/discharge period. The control circuit for the H-bridge circuit can be implemented in a miniaturized size with high reliability of operation while decreasing the number of elements attached externally even in the case where the control circuit is implemented in the form of an integrated circuit.

10 Claims, 9 Drawing Sheets

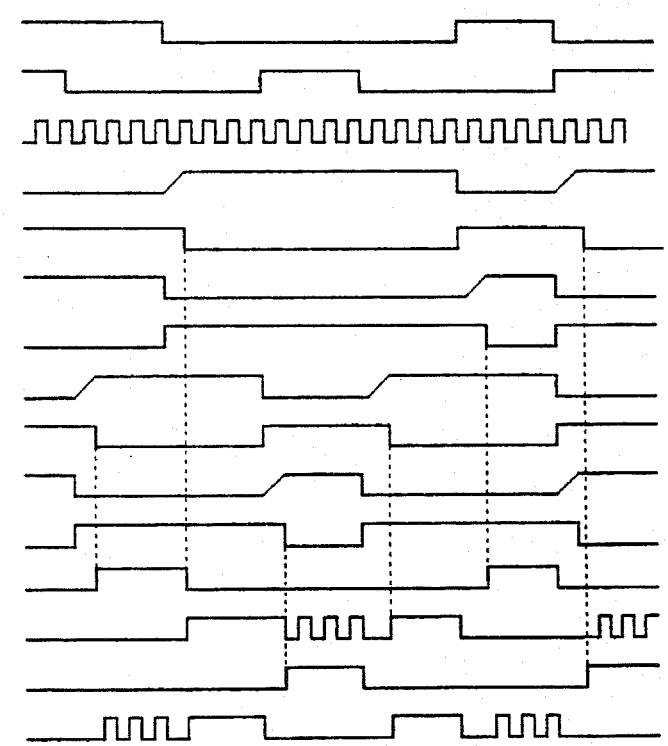

5,532,562

1

APPARATUS FOR CONTROLLING DC MOTOR WITH H-BRIDGE SWITCHING CIRCUIT

BACKGROUND OF THE INVENTION

1. Field of the Invention

The present invention generally relates to a control circuit for a DC motor driving circuit. In particular, the invention is concerned with a control circuit for ensuring safety in operation of an H-bridge circuit employed for driving and controlling a DC (Direct Current) motor, and more particularly a control circuit which is capable of preventing occurrence of a through-current flow upon turning on/off of switching elements constituting the H-bridge circuit.

2. Description of the Related Art

For better understanding of the present invention, description will first be made in some detail of the background technique. FIG. 6 is a block diagram showing a hitherto known DC motor driving circuit which includes an H-bridge switching circuit for driving and controlling a DC motor, FIG. 7 is a circuit diagram showing a predriver circuit serving as a control circuit for driving and controlling the H-bridge switching circuit shown in FIG. 6, and FIG. 8 is a circuit diagram showing in detail a major portion of the predriver circuit shown in FIG. 6.

Referring to FIG. 6, a DC motor 1 is electrically connected in the form of an H-bridge circuit together with four switching elements 3a, 3b, 3c and 3d which serve for controlling the rotation speed of the DC motor 1 by controlling the duty cycle of a pulse current supplied to the DC motor 1 as well as for reversing the direction of rotation of the DC motor 1 by changing the flow direction of the current supplied to the motor 1.

As can be seen, the first and second switching elements 3a and 3b are connected to a power supply source $V_B$, while the third and fourth switching elements 3c and 3d are connected to the ground potential. The DC motor 1 has one terminal connected to the junction between the first and third switching elements 3a and 3c and the other terminal connected to the junction between the second and fourth switching elements 3b and 3d. Further, the switching elements 3a, 3b, 3c and 3d have electrodes connected to output terminals of driving circuits 5a, 5b, 5c and 5d, respectively, which in turn have input terminals connected to a control unit 9 constituted by a computer or the like via a predriver circuit 7 which also serves as a control circuit for controlling the driving circuits 5a to 5d under the command of the control unit 9.

FIG. 7 shows a circuit configuration of the driving circuit 5a and the first switching element 3a, being understood that the other driving circuits 5b to 5d and the switching elements 3b to 3d are also implemented in substantially equivalent configurations, respectively. As can be seen in the figure, the first switching element 3a is constituted by an N-channel MOSFET (Metal Oxide Semiconductor Field Effect Transistor), while the switch driving circuit 5a is constituted by an emitter-grounded transistor 51 having a base connected to a corresponding output terminal of the predriver circuit 7 and a collector connected to the power supply source $V_B$ via a resistor 52, a transistor 53 having a base connected to the collector of the transistor 51, an emitter connected to the ground potential similarly to the transistor 51 and a collector connected to the power supply source $V_B$ via a resistor 54, and a transistor 55 having a base connected to a junction between a resistor 54 and the collector of the transistor 53, an emitter connected to an input terminal of the first switch-

2 ing element 3a and additionally connected to the collector of the transistor 53 via a diode 56 and a collector connected to the power supply source $V_B$. The configurations and connection mentioned above apply similarly to the other switching elements 3b, 3c and 3d and the other switch driving circuits 5b, 5c and 5d, as mentioned above.

In operation, when the output of the predriver circuit 7 is at a low level, the transistor 51 is in the non-conducting state (OFF) with the transistor 53 conducting (ON), as a result of which the output level of the output transistor 55 is low. Consequently, the switching element 3a (3b, 3c or 3d) is in the non-conducting or OFF-state. On the other hand, when the output of the predriver circuit 7 becomes high, the transistor 51 is turned on while the transistor 53 is turned off, which results in that the output transistor 55 is turned off. Consequently, a high level output of the transistor 55 is applied to the switching input terminal of the switching element 3a (3b, 3c or 3d) which is thus turned on.

By combining appropriately the ON/OFF operations of the switching elements 3a, 3b, 3c and 3d, each controlled in the manner described above, speed control, reversing of rotational direction of the DC motor 1 as well as braking and stoppage thereof can be realized with the current supply to the DC motor 1 being correspondingly controlled.

More specifically, referring to FIG. 6, when the first and fourth switching elements 3a and 3d are in the OFF-state, a current flows from the power supply source $V_B$ to the ground by way of the second switching element 3b, the DC motor 1 and the third switching element 3c, whereby the DC motor 1 is caused to rotate in a forward direction.

On the other hand, when the first and fourth switching elements 3a and 3d are turned on with the second and third switching elements 3b and 3c being off, a current flows from the power supply source $V_B$ to the ground via the first switching element 3a, the DC motor 1 and the fourth switching element 3d, causing the DC motor 1 to rotate in the backward or reverse direction.

Further, when the first and second switching elements 3a and 3b are turned on with the third and fourth switching element 3c and 3d being turned off, both ends of the DC motor 1 are electrically coupled through the first and second switching elements 3a and 3b, whereby the DC motor 1 is braked. Furthermore, when the first to fourth switching elements 3a to 3d are all turned off, the DC motor 1 is caused to stop. Parenthetically, in practical applications, the second and third switching elements 3b and 3c are mutually interlocked to be turned on and off in combination.

In the switching circuit composed of the switching elements 3a, 3b, 3c and 3d connected in the H-bridge form as described above, a short-circuit fault may take place between the power supply source $V_B$ and the ground if the first and third switching elements 3a and 3c or the second and fourth switching elements 3b and 3d should simultaneously be turned on, which may occur in dependence on erroneous timing at which operations of these switching elements are changed over. Such being the circumstances, the predriver circuit 7 is provided and dedicated to the control of the switching elements 3a, 3b, 3c and 3d with a view to preventing the occurrence of such short-circuit fault.

Description will now turn to the predriver circuit 7. FIG. 8 is a circuit diagram showing an exemplary configuration of a predriver circuit known heretofore. As can be seen in the figure, the predriver circuit 7 includes first to third input terminals 70a, 70b and 70c and four NOR circuits 71a, 71b, 71c and 71d provided at the output side and connected to the switch driving circuits 5a, 5b, 5c and 5d, respectively, wherein the input sides of the four NOR circuits 71a, 71b, 71c and 71d are connected in such a manner as illustrated in FIG. 8.

More specifically, the first input terminal 70a is connected to one input terminal of the first and fourth NOR circuits 71a and 71d, respectively, via an amplifier 72a and at the same time connected to one input terminal of the second NOR circuit 71b via an inverter 73a. On the other hand, the second input terminal 70b is connected to another one of the input terminals of the second NOR circuit 71b and one of the input terminals of the third NOR circuit 71c, respectively, and additionally connected to another input terminal of the first NOR circuit 71a via an inverter 73b.

Further, the first to third terminals 70a, 70b and 70c are connected to input terminals of a flip-flop circuit 74 via amplifiers 72a, 72b and 72c and inverters 73a, 73b and 73c, respectively, wherein output terminals of the flip-flop circuits 74 are connected to other input terminals of the third and fourth NOR circuits 71c and 71d, respectively.

Additionally, the first and second input terminals 70a and 70b are connected to input terminals of a delay circuit 75 via the amplifiers 72a and 72b and the inverters 73a and 73b, respectively, wherein output terminals of the delay circuit 75 are connected to the other input terminals of the first to fourth NOR circuits 71a, 71b, 71c and 71d via inverters 76a, 76b, 76c and 76d, respectively, The delay circuit 75 is comprised of four series connections, each of which includes a transistor 10, a constant current circuitry 11 and a capacitor 12 connected in parallel to the transistor 10, wherein the four series connections are connected in parallel with one another. In response to the state change (i.e., from ON-state to OFF-state or from OFF-state to ON-state) of the input signal supplied from the control unit 9 to the first and second input terminals 70a and 70b of the predriver circuit 7, the output levels of the NOR circuits 71a, 71b, 71c and 71d constituting the output stage of the predriver circuit 7 are caused to change, whereby the switching elements 3a, 3b, 3c and 3d are correspondingly turned on and off. In that case, the delay circuit 75 serves to delay the operations of the switching elements 3a, 3b, 3c and 3d such that the first and third switching elements 3a and 3c or the second and fourth switching elements 3b and 3d are positively prevented from being simultaneously turned on for the purpose of excluding the short-circuit fault mentioned hereinbefore. As a consequence, when the operating state of the DC motor 1 is to be changed over, the power supply to the DC motor 1 is temporarily or transiently cut off.

FIG. 9 shows signal waveforms at various circuit points in the predriver circuit 7 shown in FIG. 8 for illustrating operation thereof on the assumption that operation state of the DC motor 1 is changed over in the sequence of stop, forward rotation, braking, backward (reverse) rotation, braking, forward rotation and backward rotation in this order. More specifically, in FIG. 9, waveforms S1 to S3 illustrate changes in the output signals (control signals) of the control unit 9 which are applied to the first to third input terminals 70b, 70a and 70c, respectively, of the predriver circuit 7, while A to H represent signal waveforms at circuit points A to H shown in FIG. 8, respectively. Further, waveforms S5a to S5d represent output signals supplied from the first to fourth NOR circuits 71a, 71b, 71c and 71d to the first to fourth switch driving circuits 5a, 5b, 5c and 5d respectively.

The period during which the electric power supply to the DC motor 1 is cut off is referred to as the dead time. Usually, this dead time is optimally selected in dependence on the type of the DC motor 1, the switching elements 3a, 3b, 3c and 3d and other elements employed actually. With the circuit arrangement shown in FIG. 8, the dead time may be selectively determined by varying the capacity of the capacitor 12.

In the predriver circuit 7 for the switching elements 3a, 3b, 3c and 3d which constitute the H-bridge switching circuit known heretofore, at least two capacitors 12 (four capacitors in the case of the illustrated example) are required to be incorporated in the delay circuit 75 for preventing the short-circuit fault from occurring in the H-bridge switching circuit. In this conjunction, it is noted that when the predriver circuit 7 is to be implemented in the form of an integrated circuit, the capacitors 12 will have to be provided externally so that the individual capacitances can be adjusted by exchanging the capacitors in conformance with the switching elements used in the H-bridge circuit as well as the DC motor. In that case, the number of terminals of the integrated circuit for electrical connection of the capacitors 12 will necessarily be increased in dependence on the number of the capacitors to be externally attached, which provides a great obstacle to miniaturization of the integrated predriver circuit. Needless to say, increase in the number of circuit elements involves a problem that high operation reliability of the whole circuit can not be ensured.

SUMMARY OF THE INVENTION

In the light of the state of the art described above, it is an object of the present invention to provide a control circuit for an H-bridge switching circuit which can be implemented in a miniaturized size with high reliability of operation while decreasing the number of elements to be attached externally even when the control circuit is implemented in the form of an integrated circuit.

In view of the above and other objects which will become apparent as description proceeds, there is provided according to a general aspect of the present invention an apparatus for controlling operation of a DC motor with a plurality of switching elements, wherein the DC motor and the switching elements are connected in an H-bridge circuit configuration between a power supply source and the ground, which apparatus comprises control signal generating means for generating a plurality of control signals for controlling on/off operations of the switching elements, respectively, in accordance with a predetermined sequence in response to a control command signal inputted from a control unit, and control signal regulating means for regulating the control signals so that a temporal gap intervenes between preceding and succeeding ones of the control signals, wherein the control signal regulating means includes a single capacitor provided in common to the plurality of control signals for the regulation thereof and inserted between a power supply source and the ground, the temporal gap being substantially determined by a time taken for charging the single capacitor.

In a preferred mode for carrying out the invention, the control signal regulating means may include a charge/discharge circuit for charging the capacitor in response to the control command signal and discharging the capacitor when a terminal voltage appearing across the capacitor reaches a predetermined reference level, a detecting circuit for detecting coincidence between the terminal voltage and the predetermined reference level to thereby generate a detection signal, and hold circuit means for holding the control signals in response to a change in level of the control command signal up to a time point at which the detection signal is generated.

The charge/discharge circuit may include a constant current circuitry connected between the capacitor and the power supply source for electrically charging the single capacitor and a switch element having one terminal connected to the ground and another terminal connected to a junction between the constant current circuitry and the capacitor, and a driver circuit for controlling the switch element with the detection signal so that the switch element is changed over to an electrically conducting state at the time point when the terminal voltage of the capacitor coincides with the reference voltage and remains in the conducting state until a time point at which level of the control command signal changes again.

The detecting circuit may includes a comparator which has a non-inverted input terminal connected to the junction between the constant current circuitry and the capacitor, an inverted input terminal adapted to receive the reference voltage from a tap of a voltage division circuit connected between the power supply and the ground and an output terminal connected to the hold circuit for allowing the hold circuit to output the control signal whenever the capacitor is charged to the reference voltage.

The hold circuit may include flip, flop circuits for holding the control signal in response to change in level of the control command signal and outputting the control signal in response to the detection signal supplied from the detecting circuit.

With the structure of the control circuit described above, charge and discharge of the capacitor is controlled in dependence on changes in the control signal to thereby prevent occurrence of a through-current flow in the H-bridge switch circuit (i.e. occurrence of so-called short circuit fault) while allowing the bridge H-circuit to be changed over to the operation state corresponding to the control signal after lapse of the charge/discharge period. Further, by virtue of the arrangement in which only one capacitor is required for inserting a delay time (temporal gap or pause) between the successive turn-on operations of the switching elements, the control circuit can be implemented in the form of an integrated circuit of a simplified structure with number of terminals being significantly reduced, whereby the problem described hereinbefore in conjunction with the known predriver circuit shown in FIG. 8 can satisfactorily be solved. Besides, the duration of the delay time or gap can easily be adjusted by realizing the single capacitor as an externally attached element.

The above and other objects, features and attendant advantages of the present invention will more clearly be understood by reading the following description of the preferred embodiments thereof taken, only by way of example, in conjunction with the drawings.

BRIEF DESCRIPTION OF THE DRAWINGS

FIG. 9 shows signal waveforms at various circuit points in the predriver circuit shown in FIG. 8.

DESCRIPTION OF THE PREFERRED EMBODIMENTS

Now, the present invention will be described in detail in conjunction with the preferred or exemplary embodiments thereof by reference to the drawings.

Embodiment 1

Figure 1:
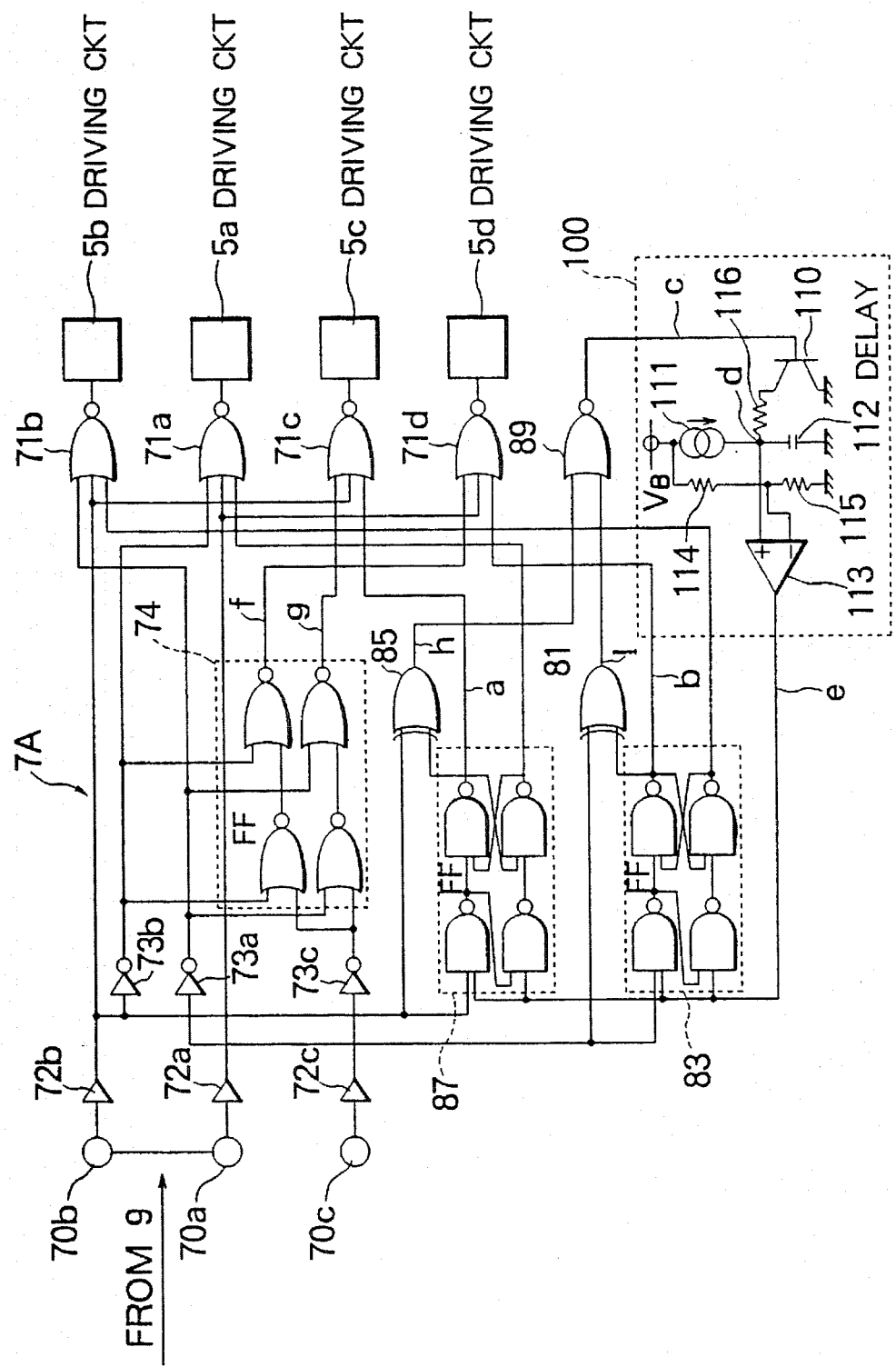
FIG. 1 is a circuit diagram showing an arrangement of a predriver circuit for driving and controlling a DC motor-driving H-bridge switching circuit according to a first exemplary embodiment of the present invention.
Figure 8:
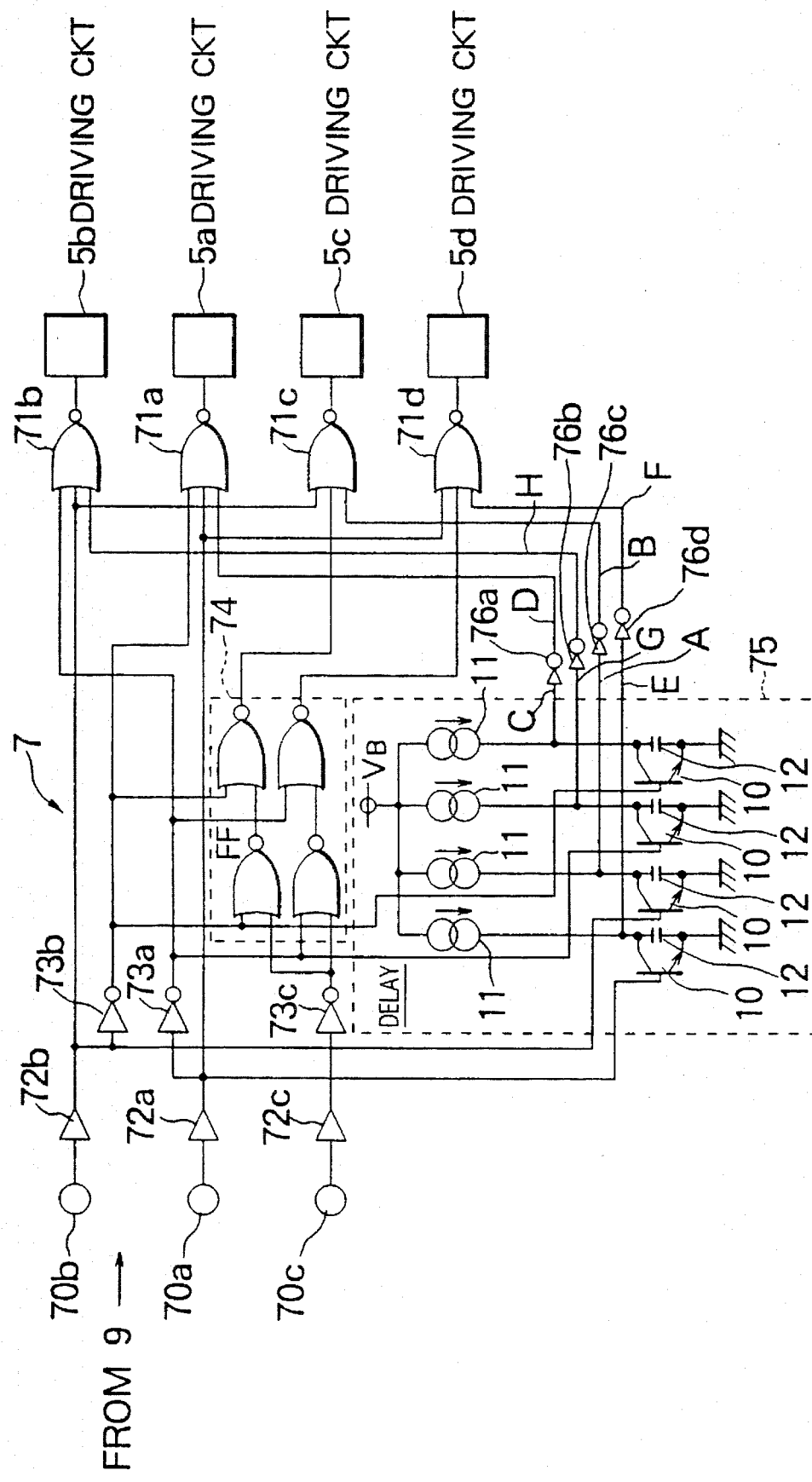
FIG. 8 is a circuit diagram showing in detail a major portion of a predriver circuit shown in FIG. 6.

FIG. 1 is a circuit diagram showing an arrangement of a predriver circuit for driving and controlling a motor driving H-bridge circuit according to a first exemplary embodiment of the invention. In the figure, circuit components which are same as or equivalent to those shown in FIG. 8 are denoted by like reference symbols. Repeated description thereof will be unnecessary.

The predriver circuit generally denoted by 7A and serving as a control circuit according to the instant embodiment differs from the predriver circuit 7 shown in FIG. 8 in that the first input terminal 70a of the predriver circuit 7A is connected to a first input terminal of a first Exclusive OR circuit 81 and an input terminal of a first D-type flip-flop 83 which is designed to store the input level and that the output of the first D-type flip-flop circuit 83 is connected to a second input terminal of the first Exclusive-OR circuit 81 and at the same time to the input terminals of the second and fourth NOR circuits 71b and 71d, respectively.

Further, the second input terminal 70b of the predriver circuit 7A is connected to a first input terminal of a second Exclusive-OR circuit 85 and an input terminal of a second D-type flip-flop circuit 87 which is destined to store the input level, while the output of the second D-type flip-flop circuit 87 is connected to a second input terminal of the second Exclusive-OR circuit 85 and the input terminals of the first and third NOR circuits 71a and 71c, respectively. The first and second flip-flop circuits 83 and 87 cooperate to constitute a hold circuit means according to the invention.

The outputs of the first Exclusive-OR circuit 81 and the second Exclusive-OR circuit 85 are connected to first and second input terminals of a fifth NOR circuit 89 which has an output connected to an input of a delay circuit 100.

Now, description will turn to the delay circuit 100. A transistor 110 whose emitter is grounded has a base connected to the output terminal of the fifth NOR circuit 89 and a collector connected via a resistor 116 to a junction node between a constant current circuitry 111 and a capacitor 112 which are connected in series between a power supply source $V_B$ and the ground potential. Further, the junction node between the constant current circuitry 111 and the capacitor 112 is connected to a non-inverted input terminal of a comparator 113 which has an inverted input terminal connected to a junction between resistors 114 and 115 which are inserted in series between the power supply source $V_B$ and the ground. Thus, the source voltage is appropriately divided by the resistors 114 and 115, wherein a voltage making appearance across the resistor 115 is inputted to the inverted input terminal of the comparator 113 as a reference voltage. The transistor 110 constitutes a part of a charge/discharge circuit for the capacitor 112. It should further be mentioned that the comparator 113 cooperates with the resistors 114, 115 and 116 to constitute a voltage detection circuit according to the present invention.

A terminal voltage of the capacitor 112 charged from the power supply source $V_B$ via the constant current circuitry 111 is inputted to the non-inverted input terminal of the comparator 113. When this voltage exceeds the reference voltage applied to the inverted input terminal of the comparator 113, the output thereof changes to a high level. The output of the comparator 113 is applied to reset terminals of the first and second flip-flop circuits 83 and 87, respectively, which cooperate to constitute the hold circuit means for holding the control signal S1 and S2 in dependence on the detection voltage output from the aforementioned voltage detection circuit.

Figure 6:
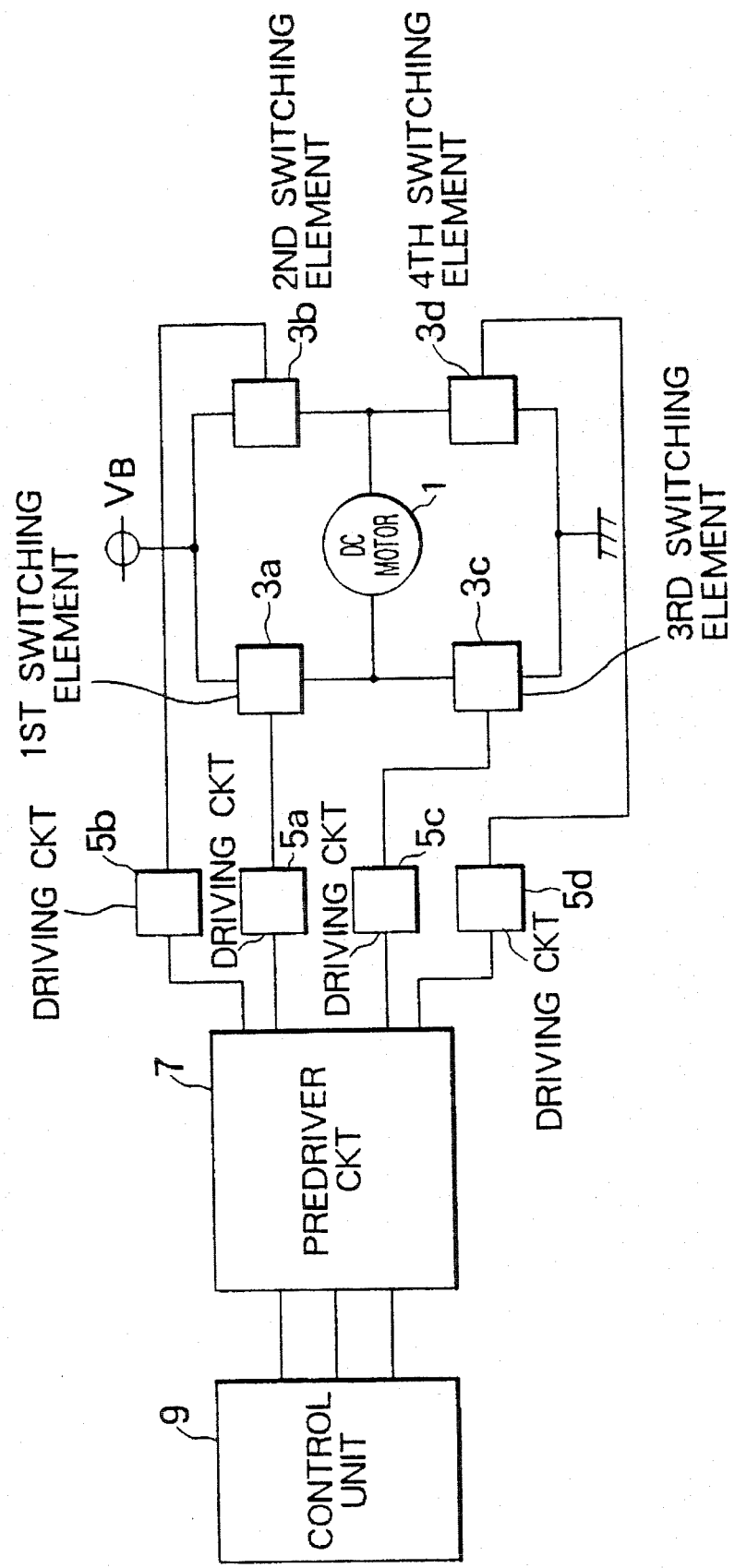
FIG. 6 is a block diagram showing a hitherto known DC motor driving circuit which includes an H-bridge switching circuit for controlling a DC motor.
Figure 7:
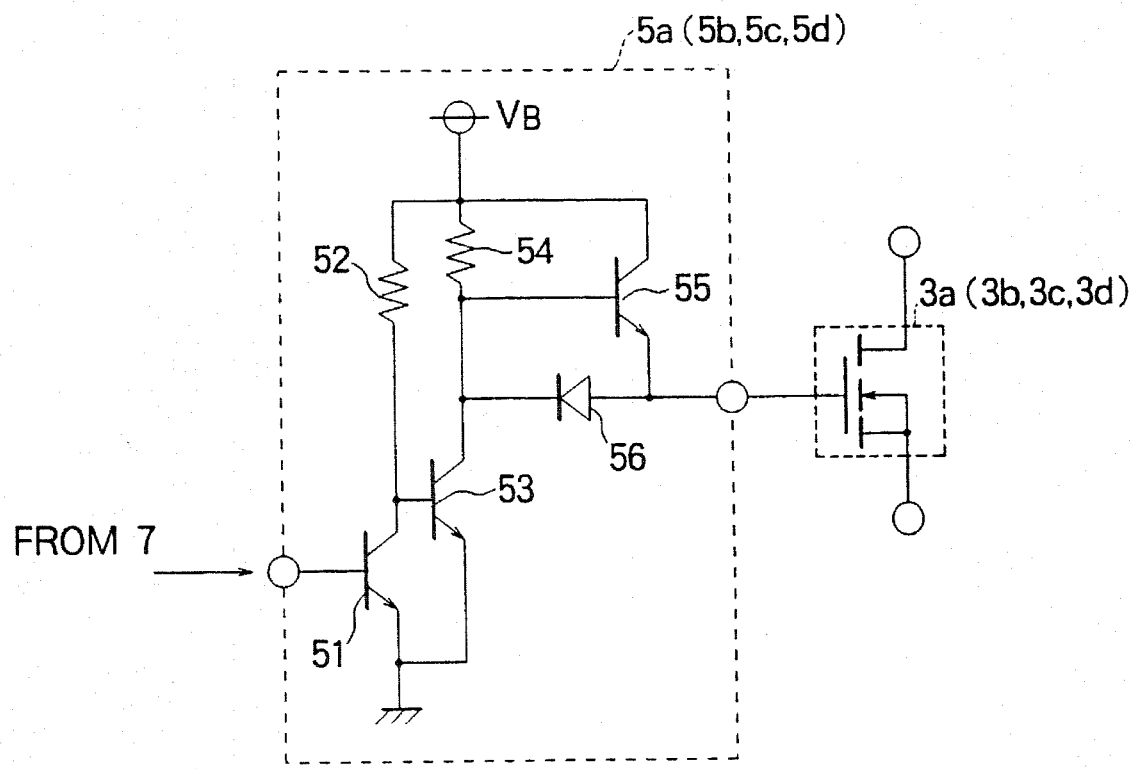
FIG. 7 is a circuit diagram showing representatively a configuration of a driving circuit for driving and controlling the H-bridge switching circuit shown in FIG. 6.

The first and second flip-flop circuits 83 and 87 have respective set terminals to which the input signals supplied to the first and second input terminals 70a and 70b of the predriver circuit 7A are applied through amplifiers 72a and 72b, respectively. As a consequence of this, the output levels of the first and second flip-flop circuits 83 and 87 remain unchanged until succeeding input signals are applied to the respective set terminals or until a high-level output of the comparator 113 is applied to the respective reset terminals. Thus, the input state or levels at the first and second input terminals 70a and 70b are stored and held by these flip-flop circuits 83 and 87. The output of the first D-type flip-flop circuit 83 is applied to the second and fourth NOR circuits 71b and 71d whose outputs in turn are supplied to the driving circuit 5b and 5d for controlling the switching elements 3b and 3c (FIG. 6), while the output of the second D-type flip-flop circuit 87 is applied to the first and third NOR circuits 71a and 71c which in turn are connected to the driving circuits 5a and 5c for the switching elements 3a and 3c.

Figure 2:
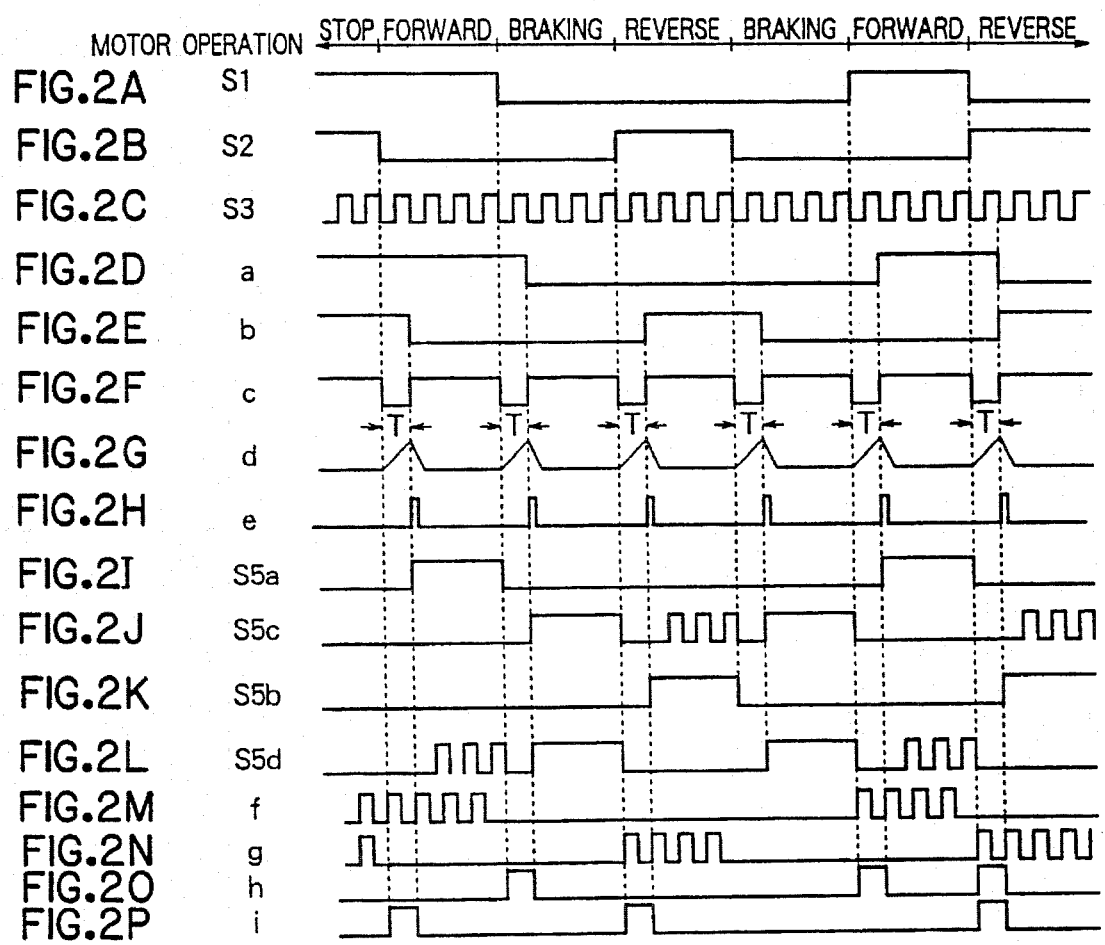
FIG. 2 is a diagram showing signal waveforms at various circuit points in the predriver circuit shown in FIG. 1 for illustrating operation thereof.

FIG. 2 shows signal waveforms at various circuit points in the predriver circuit shown in FIG. 1 for illustrating operation thereof on the assumption that operation state of the DC motor 1 changes in the sequence of stop, forward rotation, braking, backward (reverse) rotation, braking, forward rotation and backward rotation in this order. More specifically, in FIG. 2, waveforms S1 to S3 illustrate changes in the input signals applied to the first to third input terminals 70b, 70a and 70c, respectively, of the predriver circuit 7A from the control unit 9, while a to e represent signal waveforms at circuit points a to e shown in FIG. 1. Further, waveforms S5a to S5d represent output signals supplied from the first to fourth NOR circuits 71a, 71b, 71c and 71d to the first to fourth driving circuits 5a, 5b, 5c and 5d, respectively.

More specifically, referring to FIG. 2, the waveforms shown at a and b illustrate the output signals of the second and first flip-flop circuits 87 and 83, respectively, while the waveform c represents the output signal of the fifth NOR circuit 89 for controlling the capacitor discharge circuit (i.e., the transistor 110). As can be seen, when the output c of the fifth NOR circuit 89 becomes high, the transistor 110 is turned on to thereby allow the capacitor 112 to be discharged. On the other hand, when the output c of the fifth NOR circuit 89 is at a low level, the transistor 110 is set to the non-conducting state (i.e., turned off) to allow the capacitor 112 to be charged. Shown in FIG. 2 at d is a waveform of the voltage appearing at the junction between the capacitor 112 and the constant current circuitry 111, i.e., the waveform of the voltage at which the capacitor 112 is charged. It can be seen that the charge of the capacitor 112 is started in response to change in the output c of the fifth NOR circuit 89 from high to low level and that the capacitor 112 is instantaneously discharged in response to change in the output c of the fifth NOR circuit 89 from low to high level. Shown at e in FIG. 2 is the waveform of the output signal of the comparator 113. It will be seen that this signal e is output from the comparator 113 whenever the terminal voltage d of the capacitor 112 (i.e., the voltage appearing across the capacitor 112) exceeds the reference voltage applied to the inverted input terminal of the comparator 113.

Operation of the discharge circuit constituted by the transistor 110 stops when the output level b and a of the first and second flip-flop circuits 83 and 87 becomes different from the input levels, i.e., in response to change in the input levels S2 and S1. When the transistor 110 is turned off, a current is supplied to the capacitor 112 via the constant current circuitry 111 from the power supply source $V_B$, as a result of which the terminal voltage of the capacitor 112 increases at a constant rate. When the terminal voltage of the capacitor 112 exceeds the reference voltage of the comparator 113, the output e of the comparator 113 assumes a high level, which result in that the first and second flip-flop circuits 83 and 87 are reset to allow the data (input signal levels) held therein to be updated. Thus, the output levels a and b of the first and second flip-flop circuits 83 and 87 become equal to the currently applied input levels, respectively, as a result of which both the outputs i and h of the first and second Exclusive-OR circuits 81 and 85 become low with the output c of the fifth NOR circuit 89 changing to high level. Thus, the transistor 110 is turned on to start discharge of the capacitor 112. After instantaneous discharge of the capacitor 112, the terminal voltage d thereof and the output e of the comparator 113 are stabilized at the low level.

Since there are inputted to the first NOR circuit 71a the input signal S2 applied to the first input terminal 70a of the predriver circuit 7A, the inverted signal of the input signal S1 applied to the second input terminal 70b and the output signal a of the second D-type flip-flop circuit 87, the output signal of the first NOR circuit 71a becomes high when all the signals mentioned above assume low level. Consequently, the output S5a of the first switch driver circuit 5a becomes high to turn on the first switching element 3a.

Further, because there are inputted to the second NOR circuit 71b the input signal S1 applied to the second input terminal 70b of the predriver circuit 7A, the inverted signal of the input signal S2 applied to the first input terminal 70a and the output signal b of the first D-type flip-flop circuit 83, the output signal of the second NOR circuit 71b becomes high when all the signals mentioned above become low. As a result of this, the output S5b of the second switch driver circuit 5b becomes high to thereby turn on the second switching element 3b.

On the other hand, since there are inputted to the third NOR circuit 71c the input signal S1 applied to the second input terminal 70b of the predriver circuit 7A, the output signal g of the flip-flop circuit 74 and the output signal a of the second flip-flop circuit 87, the output signal of the third NOR circuit 71c assumes high level when the above-mentioned signals S1, g and a are all at low level. Consequently, the output S5c of the third switch driving circuit 5c assumes high level, resulting in that the third switching element 3c is turned on. More specifically, when both the input signal S1 applied to the second input terminal 70b and the output signal a of the second flip-flop circuit 87 are at low level and when the input signal S2 at the first input terminal 70a is at low level or when both the input signal S1 at the second input terminal 70b and the input signal S3 at the third input terminal 70c are simultaneously high, the output level of the third NOR circuit 71c becomes high.

Similarly, the input signal S1 applied to the first input terminal 70a of the predriver circuit 7A is inputted to the fourth NOR circuit 71d together with the output signal f of the flip-flop circuit 74 and the output signal b of the first flip-flop circuit 83, the output signal of the fourth NOR circuit 71d assumes high level when the above-mentioned signals S2, f and b are all at low level. Consequently, the output S5d of the fourth switch driving circuit 5d assumes high level, whereby the fourth switching element 3d is turned on. More specifically, when both the input signal S2 applied to the first input terminal 70a and the output signal b of the first flip-flop circuit 83 are at low level and when the input signal S1 at the second input terminal 70b is at low level or when both the input signal S2 at the first input terminal 70a and the input signal S3 at the third input terminal 70c are simultaneously high, the output level of the fourth NOR circuit 71d becomes high.

In this manner, the individual switching elements 3a to 3d are turned on, being always accompanied with a time delay or gap which substantially corresponds to the charging time T of the capacitor 112, as is apparent from the waveforms S5a to S5d shown in FIG. 2. For this reason, there takes place no overlap in turning-on between the first and fourth switching elements 3a and 3d and the second and third switching elements 3b and 3c, which in turn means that the short-circuit fault mentioned hereinbefore can be prevented from occurring in the switching circuit of the H-bridge configuration.

At this juncture, it should be mentioned that the circuit shown in FIG. 1 has a self-restoration function. More specifically, the first and second flip-flop circuits 83 and 87 are designed to hold specific data (i.e., input signal level) for a predetermined period. In this conjunction, it will be understood that transient change in the input signal level at the first or second input terminal 70a or 70b due to noise or the like nuisance may also bring about change in the output level b or a of the first or second flip-flop circuit 83 or 87. In that case, however, the output level i or h of the first or second Exclusive-OR circuit 81 or 85 undergoes corresponding change, rendering low the output c of the fifth NOR circuit 89 to thereby turn off the transistor 110. Consequently, when the terminal voltage (level of change) of the capacitor 112 exceeds the reference voltage, the output e of the comparator 113 changes to high level, which results in resetting of the first and second flip-flop circuit 83 and 87. As a result, the output signal of the first and second flip-flop circuits 83 and 87 will soon be restored to the level which coincides with the current input signal level.

A problem due to erroneous operation of the first and second flip-flop circuits 83 and 87 is seen in that the level of the input signal S2 or S1 to the first or second input terminal 70a or 70b changes during the erroneous operation of these flip-flop circuits to thereby change the operation states of the individual switching elements 3a to 3d. However, since the first and second flip-flop circuits 83 and 87 have the aforementioned self-restoration function validated upon lapse of the charging period of the capacitor 112, the problem is serious only when the switching of the elements 3a to 3d takes place during the period in which the capacitor 112 is charged. However, the probability of such switching operation taking place during the capacitor charging period is extremely low, and thus there arises practically no problem. Further, in the case of the instant embodiment, the data is held by the hold circuit constituted by the flip-flops 83 and 87. Accordingly, there is a possibility of the data as held changing due to erroneous operation triggered by noise or the like foreign signal originating in external circuits. However, with the circuit arrangement shown in FIG. 1, the hold circuit is reset immediately upon change in the data as held. Consequently, there can positively be avoided such situation in which any one of the switching elements 3a to 3d is erroneously turned on to give rise to a through-current flow. Thus, high reliability of operation can be ensured.

In the circuit configuration shown in FIG. 1, the terminal voltage of the capacitor 112 constituting a part of the delay circuit 100 has one stable state, wherein the stable voltage state is restored even when it undergoes transient change. As a modification of the instant embodiment, the circuit may be implemented such that the terminal voltage of the capacitor 112 can assume one of two stable states, which will be described below.

Embodiment 2

Figure 3:
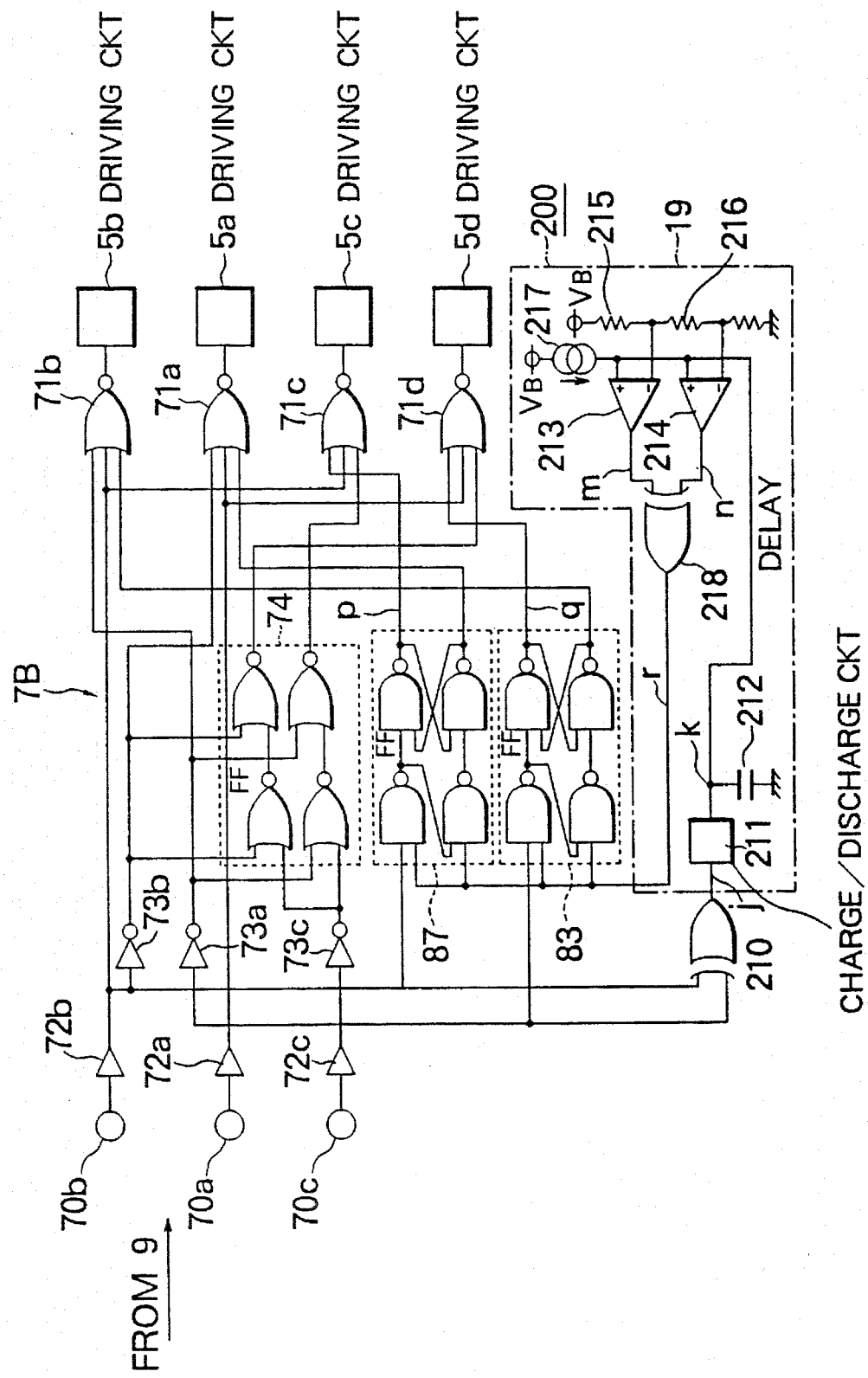
FIG. 3 is a circuit diagram of a predriver circuit according to a second embodiment of the present invention.

FIG. 3 is a circuit diagram of a predriver circuit according to a second embodiment of the present invention in which the terminal voltage of the capacitor of the delay circuit is capable of assuming two stable states or levels. The second embodiment differs from the first in respect to the structure of the delay circuit 200 which supplies a reset signal r to the first and second flip-flop circuit 83 and 87.

Referring to FIG. 3, the input signals S2 and S1 to the first and second input terminals 70a and 70b of the predriver circuit 7B serving as the control circuit for the H-bridge switching circuit are inputted to an Exclusive-OR circuit 210 via first and second amplifiers 72a and 72b, respectively, wherein the output j of the Exclusive-OR circuit 210 is inputted to a charge/discharge circuit 211 for a capacitor 212. The output k of the charge/discharge circuit is applied to one end or terminal of the capacitor 212 having the other end grounded and additionally to non-inverted input terminals of first and second comparators 213 and 214, respectively, wherein the non-inverted input terminals of the first and second comparators 213 and 214 are connected in common to one end of a constant current circuitry 217 having the other end connected to the power supply source $V_B$.

The inverted input terminals of the first and second comparators 213 and 214 are connected to first and second junction nodes, respectively, of resistors 215 and 216 which are connected in series between the power supply source and the ground, as can be seen in FIG. 3, wherein the inverted input terminals of the first and second comparators 213 and 214 are, respectively, applied with first and second reference voltages which differ from each other. In this conjunction, it should be noted that the first reference voltage for the first comparator 213 is set higher than that for the second comparator 214. The outputs m and n of the first and second comparators 213 and 214 are applied as the inputs to an Exclusive-OR circuit 218, the output r of which in turn is applied to the reset terminals of the first and second flip-flop circuits 83 and 87. The comparators 213 and 214, resistors 215 and 216 and the Exclusive-OR circuit 218 cooperate to constitute a voltage detection circuit according to the instant embodiment of the invention.

Figure 5:
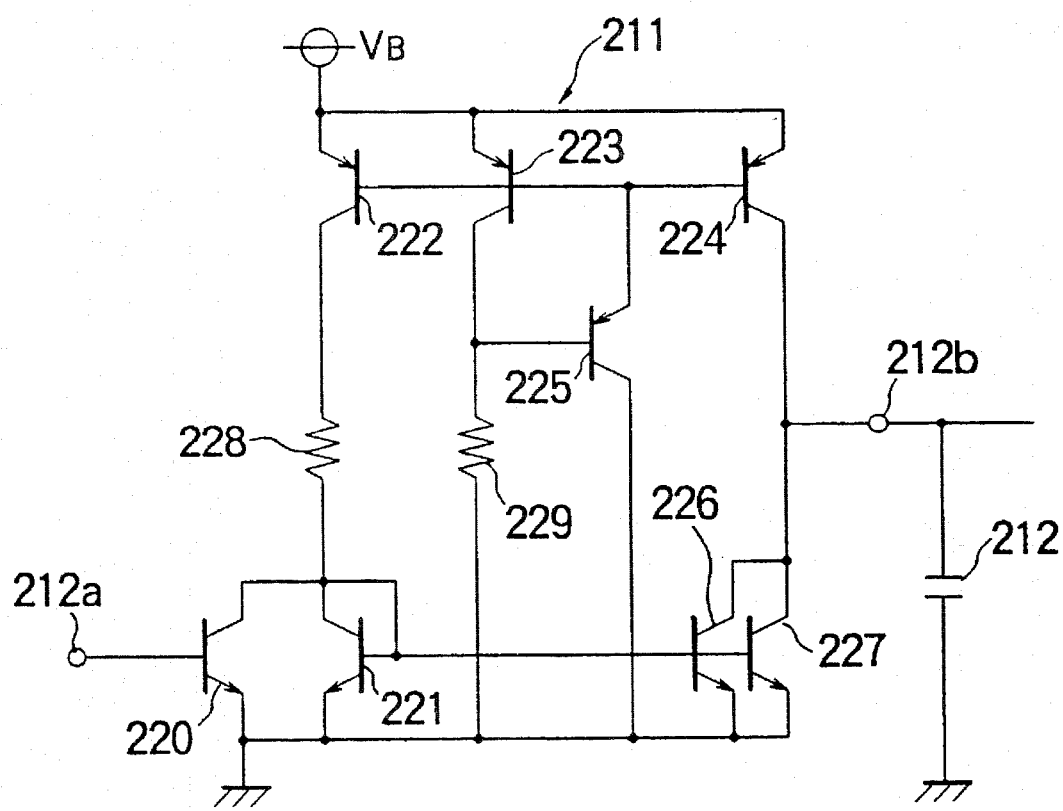
FIG. 5 is a circuit diagram showing an exemplary configuration of a charge/discharge circuit for a capacitor in the predriver circuit according to the second embodiment of the invention.

FIG. 5 is a circuit diagram showing an exemplary configuration of the charge/discharge circuit 211 for the capacitor 212. Referring to the figure, an input terminal 212a is connected to the output of the Exclusive-OR circuit 210, while an output terminal 212b is connected to the capacitor 212 and the non-inverted input terminals of the first and second comparators 213 and 214, wherein transistors 220 to 227 and resistors 228 and 229 are connected between the input and output terminals 212a and 212b in such a manner as shown in FIG. 5.

Figure 4:
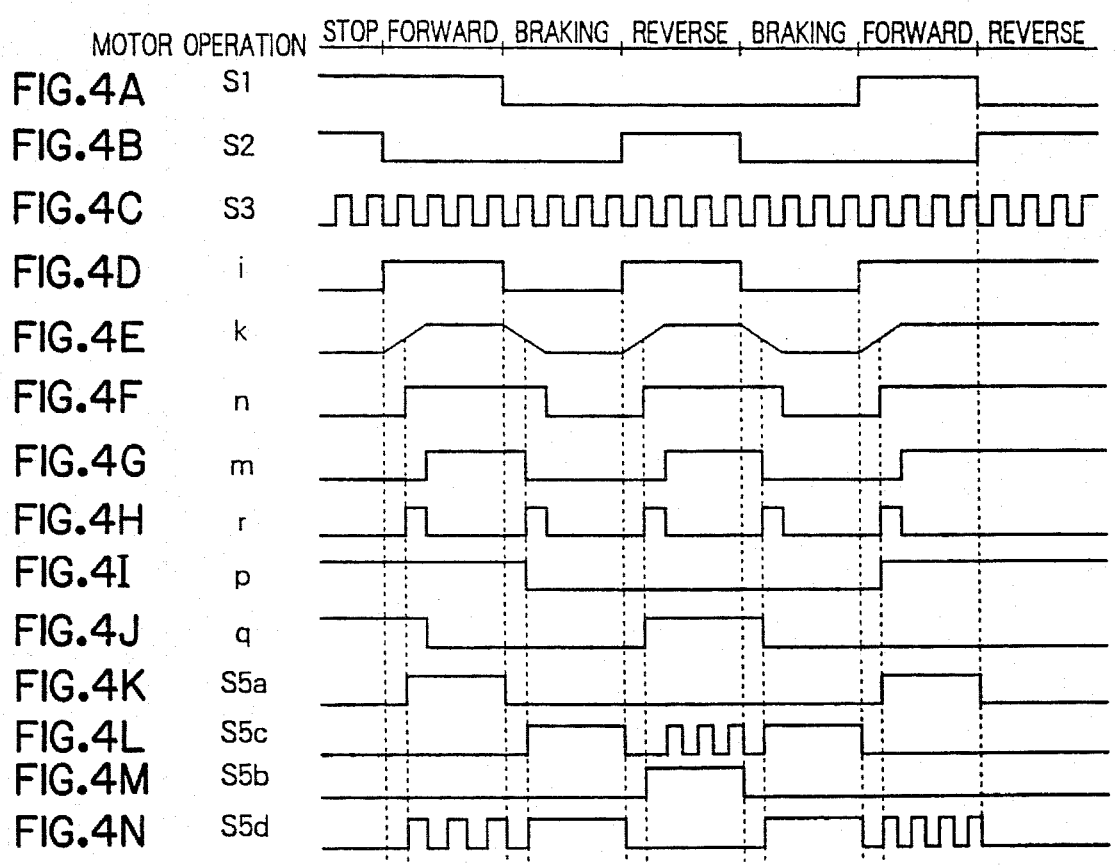
FIG. 4 shows signal waveforms at various circuit points in the predriver circuit shown in FIG. 3 for illustrating operation thereof.

FIG. 4 shows signal waveforms at various circuit points in the predriver circuit shown in FIG. 3 for illustrating operation thereof on the assumption that operation state of the DC motor 1 changes in the sequence of stop, forward rotation, braking, backward (reverse) rotation, braking, forward rotation and backward rotation in this order. More specifically, in FIG. 4, waveforms S1 to S3 illustrate changes in the input command signals applied to the first to third input terminals 70b, 70a and 70c, respectively, of the predriver circuit 7B from the control unit 9, while j to r represent signal waveforms at circuit points j to r shown in FIG. 3. Further, waveforms S5a to S5d represent output signals supplied from the first to fourth NOR circuits 71a, 71b, 71c and 71d to the first to fourth switch driving circuits 5a, 5b, 5c and 5d, respectively.

As can be seen from FIG. 4, the capacitor 212 is electrically charged through the charge/discharge circuit 211 during a period in which the output signal j of the Exclusive-OR circuit 210 is at high level, while the capacitor 212 is caused to discharge when the output signal j is at low level, as a result of which a voltage such as shown at k in FIG. 4 makes appearance across the capacitor 212. This voltage k is applied to the inverted input terminals of the first and second comparators 213 and 214, respectively, to be compared with the first and second mutually different reference voltages applied to the non-inverted input terminals of the first and second comparators 213 and 214, respectively. The first and second comparators 213 and 214 generate the outputs m and n of high level when the capacitor voltage k is higher than the first and second reference voltages.

The Exclusive-OR circuit 218 generates the output signal r of high level when the outputs m and n of the first and second comparators 213 and 214 differ from each other, wherein the output signal r is applied to the reset terminals of the first and second flip-flop circuits 83 and 87 which respond thereto by generating output signals of waveforms illustrated at q and p in FIG. 4, respectively. The output signals q and p of the first and second flip-flop circuits 83 and 87 are inputted to the first to fourth NOR circuits 71a, 71b, 71c and 71d, as shown in FIG. 3, whereby output signals of waveforms shown at S5a, S5b, S5c and S5d in FIG. 4 are supplied to the first to fourth switch driving circuits 5a, 5b, 5c and 5d from the first to fourth NOR circuits 71a, 71b, 71c and 71d, respectively.

In the case of the instant embodiment, the voltage k appearing across the capacitor 212 represents the operation state of the motor 1. More specifically, when the capacitor voltage k is at high level, this means that the motor is operated either in the forward or backward direction, while the low capacitor voltage k indicates that the motor 1 is either in the state being braked or stopped. When the capacitor voltage k changes from high to low level or low to high level, the contents held by the first and second flip-flops 83 and 87 are updated after lapse of a predetermined delay time.

The predriver circuit according to the instant embodiment is characterized in that no delay operation is effected when change in the operation state takes place. In other words, upon change in the operation state from braking to the stationary state or vice versa or from the forward to reverse rotation or vice versa, no delay operation is effected. In this connection, it should be noted that no delay operation is required upon change in the motor operation state from the braking to the stop state or from the stationary state to the braking. Same holds true in the case where operation state of the motor changes from the forward rotation to the backward rotation or vice versa.

When the charge/discharge circuit 211 is implemented in the form of an integrated circuit, the capacitor 212 is preferably to be an externally attached element for allowing the capacitance to be changed or adjusted by exchanging the capacitor 212, as mentioned hereinbefore. In this case, the capacitor 212 may be realized as an externally attached element or alternatively be incorporated in the integral circuit.

Many features and advantages of the present invention are apparent form the detailed specification and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described.

By way of example, although it has been mentioned that the capacitor 112 is implemented as an externally attached element, it should be appreciated that the resistor 115 or 229 may equally be realized as an externally attached element for the purpose of regulating the control timing.

Accordingly, all suitable modifications and equivalents may be resorted to, falling within the spirit and scope of the invention.

I claim:

1. An apparatus for controlling operation of a DC motor with a plurality of switching elements, wherein the DC motor and the switching elements are connected in an H-bridge circuit configuration between a power supply source and the ground, comprising:

control signal generating means for generating a plurality of control signals for controlling on/off operations of the switching elements, respectively, in accordance with a predetermined sequence in response to a control command signal inputted from a control unit; and means for regulating the control signal so that a time gap of a predetermined duration intervenes between preceding and succeeding ones of the control signals, said means for regulating including:

a single capacitor inserted between a power supply source and the ground, charge/discharge circuit means for charging the capacitor in response to a change in level of the control command signal and for discharging the single capacitor when a terminal voltage appearing across the single capacitor coincides with a predetermined reference level, detecting circuit means for detecting coincidence between said terminal voltage and said predetermined reference level to thereby generate a detection signal, hold circuit means for holding the control signals in response to a change in level of said control command signal until generation of said detection signal, output circuit means for outputting said control signals for controlling said switching elements in response to said detection signal, and circuit means for determining the duration of the time gap on the basis of time taken for charging the single capacitor.

2. A control apparatus according to claim 1, wherein said charge/discharge circuit includes a constant current circuitry connected between said capacitor and said power supply source for electrically charging said capacitor and a switch element having one terminal connected to the ground and another terminal connected to a junction between said constant current circuitry and said capacitor; and control means for controlling said switch element with said detection signal so that said switch element is changed over to an electrically conducting state at the time point when said terminal voltage of said capacitor coincides with said reference voltage and remains in said conducting state until a change occurs in the level of said control command signal.

3. A control apparatus according to claim 2, wherein said detecting circuit means includes a comparator which has a non-inverted input terminal connected to said junction between said constant current circuitry and said capacitor, an inverted input terminal adapted to receive said reference voltage from a tap of a voltage division circuit connected between said power supply and the ground and an output terminal connected to said hold circuit means for allowing said hold circuit means to output said control signals whenever said capacitor is charged to said reference voltage.

4. A control apparatus according to claim 2, wherein said hold circuit means includes flip-flop circuit means for holding said control signals in response to said control command signal and outputting said control signals in response to said detection signal supplied from said detecting circuit means.

5. A control apparatus according to claim 4, wherein said flip-flop circuit means is provided with a self-restoring circuit;

said self-restoring circuit including a logical circuitry having input terminals supplied with said control command signal and output signals of said flip-flop circuit means and an output terminal connected to a control terminal of said switch element for thereby protecting said control signals from being affected by noise component possibly superposed on said control command signal.

6. A control apparatus according to claim 1, wherein said switching elements are constituted by first and second pairs of switching elements, each of said first and second pairs being connected between said power supply source and the ground with said DC motor being interposed in common between said switching elements of said first and second pairs;

said control command signal being supplied in the form of a pair of first and second pulse signals each changing between low and high levels for commanding controls of said first and second pairs of switching elements through combinations of said low and high levels;

wherein said means for regulating includes:

charge/discharge circuit means for charging said capacitor in response to a change in the level of any one of said first and second pulse signals and discharging said capacitor when a terminal voltage appearing across said single capacitor coincides with a predetermined reference level; and a pair of first and second flip-flop circuits for holding said first and second pulse signals in response to changes in levels thereof, said first and second flip-flop circuits being reset in response to said detection signal for thereby outputting first and second output signals, respectively; and logical output circuit means for logically combining said first and second control command signals and said first and second output signals to thereby output first and second pairs of control signals for controlling said first and second pairs of switching elements, respectively.

7. A control apparatus according to claim 6, said control command signal including a third pulse signal to be superposed on either one of said first pair of output signals;

said third pulse signal having a duty cycle for controlling operation of said DC motor in one of rotating directions.

8. A control apparatus according to claim 6, said control command signal including a third pulse signal to be superposed on either one of said second pair of output signals;

said third pulse signal having a duty cycle for controlling operation of said DC motor in the other rotating direction.

9. A control apparatus according to claim 2, wherein said detecting circuit means includes:

a first comparator having one input connected to the single capacitor and the other input connected to a first reference voltage for generating a first output signal when the terminal voltage of the single capacitor attains the first reference voltage;

a second comparator having one input connected to the single capacitor and the other input connected to a second reference voltage which is lower than the first reference voltage, thereby generating a second output signal when the terminal voltage of the single capacitor equals the second reference voltage; and logical circuit means for outputting detection signal in response to either the first output signal or the second output signal.

10. A control circuit for an H-Bridge circuit including a control unit for generating a variable level control command signal, said control circuit, comprising:

a single capacitor;

a charge/discharge circuit for charging/discharging said capacitor over a given time period in response to the variable level control command signal wherein charge and discharge of said capacitor is controlled in dependence of changes in the level of said variable level control command signal so as to prevent occurrence of a through-current flow in said H-bridge switch circuit while allowing said H-bridge switch circuit to be changed over to an operation state indicated by said variable level command signal after lapse of the given time period for charge/discharge said capacitor;

voltage detection means for detecting a terminal voltage appearing across said capacitor; and hold means for holding the variable level control command signal in response to a detection voltage detected by said voltage detection circuit.

\* \* \* \* \*